(12) United States Patent  
Cai

(10) Patent No.: US 7,833,163 B2  
(45) Date of Patent: Nov. 16, 2010

(54) STEERING ANGLE VARIED PATTERN FOR ULTRASOUND IMAGING WITH A TWO-DIMENSIONAL ARRAY

(75) Inventor: Anming He Cai, San Jose, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1727 days.

(21) Appl. No.: 10/732,136

(22) Filed: Dec. 10, 2003

(65) Prior Publication Data

US 2005/0131298 A1 Jun. 16, 2005

(51) Int. Cl.
*A61B 8/00* (2006.01)

(52) U.S. Cl. .................. 600/459; 600/437; 600/447; 600/449

(58) Field of Classification Search .......... 600/437–472; 382/294, 232, 236, 276, 298
See application file for complete search history.

(56) References Cited

U.S. PATENT DOCUMENTS

| | | | |
|---|---|---|---|
| 4,550,606 A * | 11/1985 | Drost | 73/626 |
| 4,693,319 A | 9/1987 | Amemiya | |
| 5,490,512 A * | 2/1996 | Kwon et al. | 600/447 |
| 5,549,111 A | 8/1996 | Wright et al. | |
| 5,675,554 A | 10/1997 | Cole et al. | |
| 5,740,128 A | 4/1998 | Hossack et al. | |
| 5,793,701 A * | 8/1998 | Wright et al. | 367/7 |
| 5,833,614 A | 11/1998 | Dodd et al. | |
| 5,913,823 A | 6/1999 | Hedberg et al. | |
| 5,922,962 A * | 7/1999 | Ishrak et al. | 73/632 |
| 6,013,032 A * | 1/2000 | Savord | 600/443 |
| 6,016,285 A * | 1/2000 | Wright et al. | 367/11 |
| 6,027,448 A | 2/2000 | Hossack et al. | |
| 6,122,223 A * | 9/2000 | Hossack | 367/11 |
| 6,132,375 A | 10/2000 | Napolitano | |
| 6,193,659 B1 * | 2/2001 | Ramamurthy et al. | 600/443 |
| 6,193,663 B1 | 2/2001 | Napolitano et al. | |
| 6,221,018 B1 * | 4/2001 | Ramamurthy et al. | 600/443 |
| 6,222,948 B1 * | 4/2001 | Hossack et al. | 382/294 |
| 6,312,379 B1 | 11/2001 | Bradley et al. | |

(Continued)

OTHER PUBLICATIONS

"Transmit Aperture Processing for Nonlinear Contrast Agent Imaging," by S. Krishnan and M. O'Donnell; Electrical Engineering and Computer Science Department and Bioengineering Program, University of Michigan, Ann Arbor, Michigan; Ultrasonic Imaging 18, 77-105 (1996), Article No. 0005; Copyright 1996 by the Academic Press, Inc.

*Primary Examiner*—Long V Le
*Assistant Examiner*—Sanjay Cattungal

(57) ABSTRACT

Methods and systems for varying a pattern as a function of steering angle for medical imaging with a multidimensional array are provided. Transmit waveform, delay, phase or apodization patterns in addition to delays, phases or apodization for focusing are used with a multidimensional array. By applying a periodic variation perpendicular to the steering direction, the effects of grating lobes due to the variation may be reduced. Along the steering direction, additional offsets are not provided, but may be provided. This different or non-existent offsets provide less grating lobe clutter. The transmit aperture is adjusted to be parallel to a direction of steering of non-normal transmit scan line or scan lines. The variation pattern is selected to result in enhancement or isolation of one or more frequency bands from one or more other frequency bands, such as isolation of second harmonic information from fundamental transmit frequency information.

20 Claims, 2 Drawing Sheets

U.S. PATENT DOCUMENTS

| | | | |
|---|---|---|---|
| 6,398,733 B1 * | 6/2002 | Simopoulos et al. | 600/443 |
| 6,436,046 B1 | 8/2002 | Napolitano et al. | |
| 6,443,897 B1 | 9/2002 | Dubberstein et al. | |
| 6,508,767 B2 * | 1/2003 | Burns et al. | 600/443 |
| 6,592,524 B2 | 7/2003 | Urbano et al. | |
| 6,679,846 B2 | 1/2004 | Napolitano et al. | |
| 6,682,482 B1 | 1/2004 | Krishnan | |
| 6,682,483 B1 * | 1/2004 | Abend et al. | 600/437 |
| 6,755,786 B2 * | 6/2004 | Frisa et al. | 600/443 |
| 6,806,623 B2 | 10/2004 | Petersen et al. | |
| 7,094,204 B2 | 8/2006 | Banjanin et al. | |
| 7,105,981 B2 | 9/2006 | Lazenby | |
| 7,295,693 B2 * | 11/2007 | Kaufman et al. | 382/131 |
| 7,307,374 B2 * | 12/2007 | Ossmann | 310/335 |
| 7,399,279 B2 * | 7/2008 | Abend et al. | 600/450 |
| 7,530,356 B2 * | 5/2009 | Slayton et al. | 128/898 |
| 2003/0011285 A1 * | 1/2003 | Ossmann | 310/334 |
| 2003/0018253 A1 | 1/2003 | Napolitano et al. | |
| 2003/0187355 A1 | 10/2003 | Ogawa | |
| 2004/0015081 A1 | 1/2004 | Kramer et al. | |
| 2004/0092817 A1 * | 5/2004 | Brock-Fisher | 600/431 |
| 2004/0158154 A1 * | 8/2004 | Hanafy et al. | 600/446 |
| 2005/0033179 A1 | 2/2005 | Gardner et al. | |
| 2005/0093859 A1 * | 5/2005 | Sumanaweera et al. | 345/419 |
| 2006/0074313 A1 * | 4/2006 | Slayton et al. | 600/439 |
| 2006/0184036 A1 * | 8/2006 | Lazenby | 600/472 |
| 2006/0235300 A1 * | 10/2006 | Weng et al. | 600/439 |
| 2006/0264754 A1 * | 11/2006 | Frisa et al. | 600/447 |
| 2009/0066915 A1 * | 3/2009 | Lai | 351/216 |

* cited by examiner

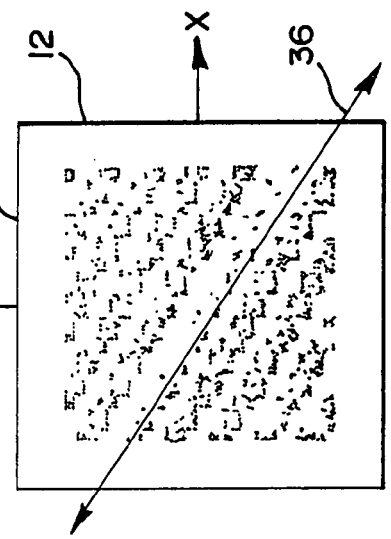
FIG.3
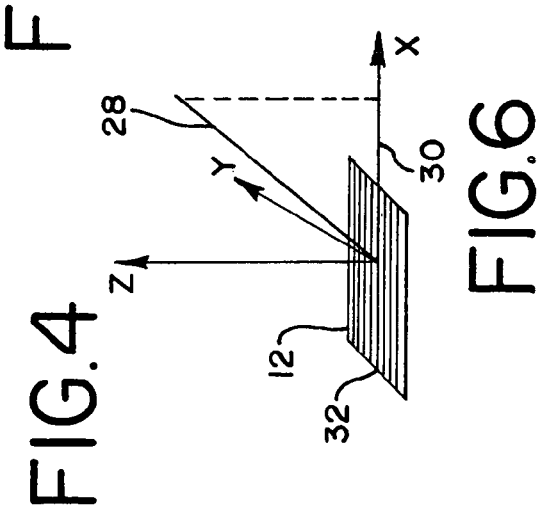
FIG.4
FIG.5
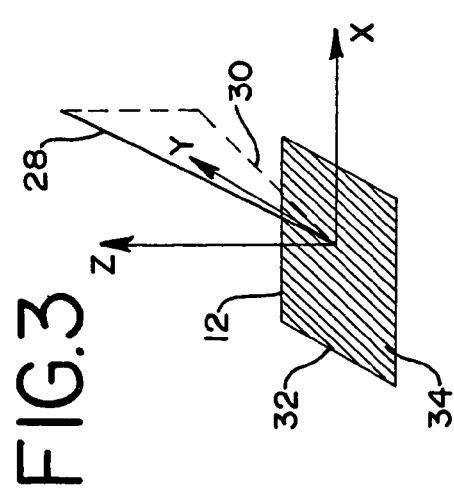
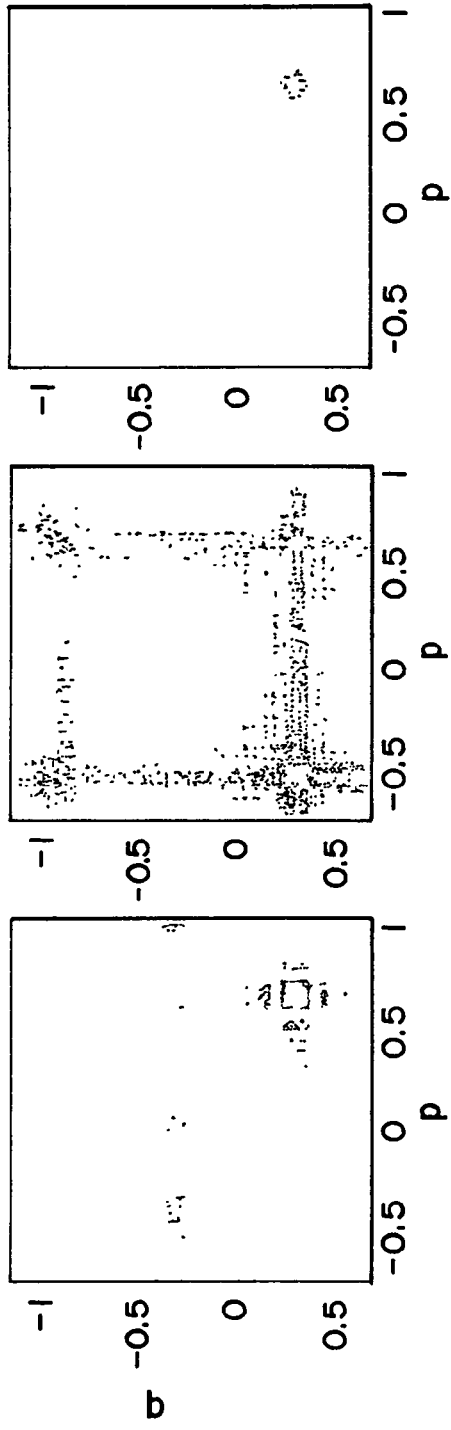
FIG.6

STEERING ANGLE VARIED PATTERN FOR ULTRASOUND IMAGING WITH A TWO-DIMENSIONAL ARRAY

BACKGROUND

The present invention relates to medical imaging with a multidimensional array. In particular, medical imaging at selected frequency bands with a multidimensional array is provided.

Imaging at particular frequency bands may provide increased resolution and signals associated with less clutter or noise. For example, signals at a second harmonic of a fundamental transmit frequency have increased resolution and decreased clutter level as compared to signals at the fundamental frequency band. One way to obtain information at a desired frequency band is to apply relative apodization, delay or phase patterns across the elements of a one-dimensional transmit aperture or across scan lines for a two-dimensional plane. By combining information associated with different phases, delays or apodizations, information at desired frequency bands may be isolated from information of undesired frequency bands. For example, as disclosed in U.S. Pat. No. 6,193,659, every other element of a transmit aperture transmits a waveform with a first phase. The other elements transmit the waveform 180 degrees out of phase with the first waveform. The waveforms sum in the acoustic domain, maintaining information at a second harmonic frequency band while canceling out information in the transmit signal at the same or fundamental frequency band. As yet another example, alternating scan lines are associated with different phases, such as an alternating periodic pattern of a 180 degrees phase shifts between adjacent scan lines. By combining information associated with two or more scan lines, various frequency bands may be cancelled while isolating information at other frequency bands. However, applying a periodic pattern across the transmit aperture may increase grating lobe levels. Increased grating lobe levels contribute clutter to an image. Applying a periodic pattern across scan-lines may use overlaps between scan lines, so may reduce frame rate.

BRIEF SUMMARY

The present invention is defined by the following claims, and nothing in this section should be taken as a limitation on those claims. By way of introduction, the preferred embodiments described below include methods and systems for varying a pattern as a function of steering angle for medical imaging with a multidimensional array. Transmit waveforms (e.g., such as the waveform polarity) as well as delay, phase or apodization patterns in addition to delays, phases or apodization for focusing are used with a multidimensional array. By applying a periodic variation perpendicular to the steering direction, the effects of grating lobes due to the variation may be reduced. The transmit aperture is adjusted to be parallel to a direction of steering of a non-normal transmit scan line or scan lines. For each non-normal transmit scan line, the azimuth plane is defined by the scan line and the normal vector of the transducer surface that intersects the scan line at the transducer surface, while the elevation plane is defined as the plane that includes this normal vector and is perpendicular to the azimuth plane. Along the elevation dimension or perpendicular to the steering direction, periodic variation in addition to focusing profiles are provided. The variation pattern is selected to result in enhancement or isolation of one or more frequency bands from one or more other frequency bands, such as isolation of second harmonic information from fundamental transmit frequencies. Along the azimuth dimension of the adjusted transmit aperture, no or little additional periodic variation of waveforms, delays, phase or apodization is provided in addition to focusing profiles. Along the steering direction, additional offsets are not provided in one embodiment, but may be provided in other embodiments. Different or no additional offsets may provide less grating lobe clutter.

In a first aspect, a method for varying a pattern as a function of steering angle for medical imaging with a multi-dimensional array is provided. An azimuth axis of a transmit aperture of a multi-dimensional array is set as substantially parallel with a first steering vector on the face of the array of transducer elements. The array of transducer elements is an N×M array where both N and M are greater than 1. An alternating pattern is applied substantially perpendicular to the steering vector. The alternating pattern is a variation in one of waveform, delay, phase, apodization and combinations thereof along the elevation axis.

In a second aspect, a system for varying a pattern as a function of steering angle for medical imaging with a multi-dimensional array is provided. A multi-dimensional array has N×M transducer elements where both N and M are greater than 1. A transmit beamformer is operable to set an azimuth axis of a transmit aperture on the multi-dimensional array as substantially parallel with a steering vector on the face of the array. The transmit beamformer is operable to apply an alternating pattern substantially perpendicular to the steering vector. The alternating pattern is a variation in one of waveform, delay, phase, apodization and combinations thereof.

In a third aspect, a method for varying a pattern as a function of steering angle for medical imaging with a multi-dimensional array is provided. A periodic pattern of offsets is applied along a first profile for focusing along a first axis substantially perpendicular to an intersection of a scan line vector component with a multi-dimensional transducer. A second profile is applied for focusing along a second axis substantially parallel with the intersection. The second profile is substantially free of additional offsets.

Further aspects and advantages are discussed below in conjunction with the preferred embodiment.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIGS. 3-5 are graphical representations of the spatial relationship between a non-normal scan line and a multi-dimensional array; and FIG. 6 is a graphical representation of grating lobe effects using pattern variation in one embodiment.

DETAILED DESCRIPTION OF THE DRAWINGS AND PRESENTLY PREFERRED EMBODIMENTS

Spectrum control is provided for multi-dimensional transducer arrays. Using cyclic phase aperture or other variation of focusing profiles differently along different dimensions of the array, undesirable frequency components may be cancelled. Spectrum control with reduced grating lobes may assist in three- or four-dimensional imaging frame rates. By applying different waveforms, delays, phasing or apodization between transmit elements or between transmit beams, information at selected frequency variants may be isolated without requiring multiple firings to the same spatial location. Selected cancellation of certain frequency bands is provided with minimal or no grating lobe artifacts caused by periodic variation in focusing profiles. Two-dimensional imaging may also take advantage of the reduced grating lobes.

Figure 1:
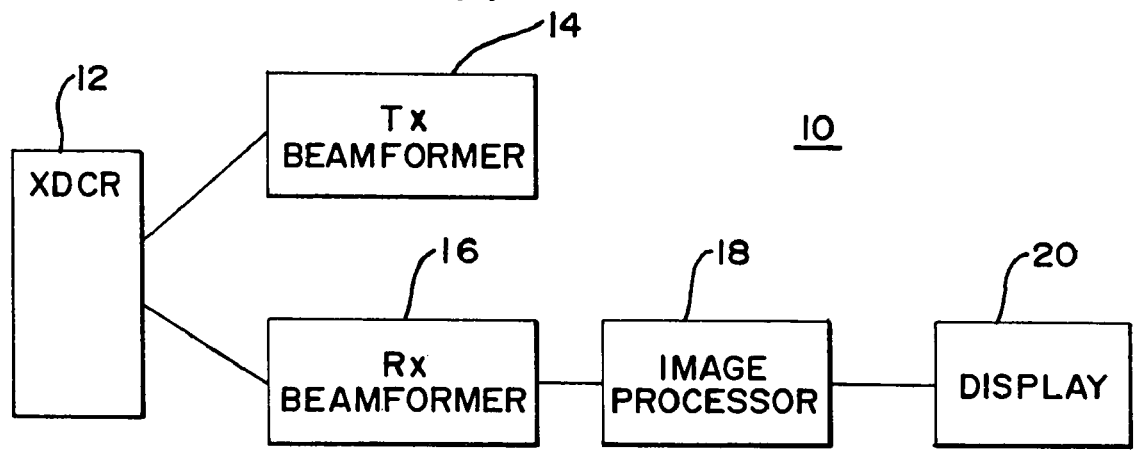
FIG. 1 is a block diagram of one embodiment of a system for applying steering angle varied patterns in ultrasound imaging with a two-dimensional array.

FIG. 1 shows a system 10 for varying a pattern as a function of steering angle for medical imaging with a multi-dimensional transducer array 12. The system also includes a transmit beamformer 14, a receive beamformer 16, an image processor 18 and a display 20. Different, fewer or additional components may be provided. In one embodiment, the system 10 is a medical diagnostic ultrasound system for two-, three- or four-dimensional imaging.

The multi-dimensional array 12 is a capacitive membrane ultrasound transducer or a piezoelectric based transducer. The array 12 includes a plurality of elements in an N×M arrangement where both M and N are greater than 1. For example, the array 12 is a 1.25, 1.5, 1.75, two-dimensional or other multi-dimensional array of elements. In one embodiment, the array 12 includes elements spaced along a plurality of parallel rows. In alternative embodiments, an irregular multi-dimensional pattern is provided, such as having some rows with fewer elements than other rows, different size elements, non-parallel rows, circular arrangements or any other now known or later developed pattern of electrodes along two dimensions. As used herein, an N×M arrangement includes rectangular and square distributions of elements as well as any of the other patterns discussed above. N×M indicates a multi-dimensional array as opposed to a linear array.

The transmit beamformer 14 is any of various now known or later developed transmit beamformers and associated electronics. For example, the transmit beamformers, associated components or systems disclosed in U.S. Pat. Nos. 6,221,018; 6,193,659; 6,436,046, the disclosures of which are incorporated herein by reference, are used. The transmit beamformer 14 includes a plurality of channels, each channel having a delay and/or phase rotator and an amplifier. The delays, phase rotators and amplifiers are operable to provide focusing profiles (apodization and phase/delay). The focusing profiles act to steer acoustic energy generated in response to each of the channels along one or more beams during a transmit event. A waveform for one channel is delayed relative to another channel. The developed delays across an aperture in any given dimension or direction provide a focusing profile. Likewise, relative amplification with an amplifier, digital-to-analog converter, transformer, waveform generator or other device allows for relative amplification across channels for another focusing profile.

The transmit beamformer 14 also includes a plurality of waveform generators, such as one waveform generator for each or for a group of channels. In one embodiment, the waveform generators are oscillators or other devices for generating unipolar, bipolar or other waveforms. Other multi-level waveform generators may be used, such as for generating waveforms with four or more different amplitude levels. Each waveform can be designed to have the maximal output in the desired frequency band and minimal output in the undesired frequency band, such as disclosed in U.S. Pat. Nos. 5,833,614 and 5,913,823, the disclosures of which are incorporated herein by reference. For bipolar and unipolar waveform generators, a focusing profile is implemented by digital or analog delays. Alternatively, the waveform generators include memories, digital-to-analog converters or other devices for generating unipolar, bipolar or sinusoidal waveforms, such as disclosed in U.S. Pat. No. 5,675,554, the disclosure of which is incorporated herein by reference.

In one embodiment, part or all of the transmit beamformer 14 is included with the transducer 12 in a scan head or probe. In other embodiments, the transmit beamformer 14 is included in a system connected through a cable to the transducer 12.

The transmit beamformer 14 or a separate transmit and receive switch at the transducer 12, between the transducer 12 and the transmit beamformer 14 or at the transmit beamformer 14 is operable to selectively connect various channels of the transmit beamformer to various elements or groups of elements of the transducer array 12. For example, a multiplexer, group of transistors, application specific integrated circuit, or other now known or later developed device switchably interconnects one of different channels to any one element of a subset. Alternatively, a given channel is connectable with any given element. As yet another alternative, one or more channels are permanently connected with one or more elements.

The transmit beamformer 12 is operable to cause the multi-dimensional transducer array 12 to generate a transmit beam of acoustic energy at any of various angles to the phase of the transducer array 12. The transmit beam is transmitted along a non-normal scan line. Non-normal scan lines are at angles other than orthogonal to the face of the array 12 at the intersection of the line with the array 12. For example, non-normal is at an angle other than 90 degrees along one dimension at the line origin on a curved or planar array. Normal scan lines may also be used. For the non-normal scan lines, steering vector components on the plane or surface of the transducer array face is provided either parallel to, perpendicular to or at an angle to any rows of elements. The steering vector component at the face of the transducer array 12 represents an intersection of the scan line vector with the multi-dimensional array. In one embodiment for three- or four-dimensional imaging, the transmit beams are steered along a plurality of scan lines within a respective plurality of planes in any of various now known or later developed patterns. Alternatively, regular spacing of the scan lines is provided without planar scans.

Through the selection of channels, the selection of connections between various channels and elements of the array 12 and/or control of focusing profiles, the transmit beamformer 14 is operable to set an azimuth axis of a transmit aperture on the multi-dimensional array 12 as substantially parallel with the steering vector component on the face of the multi-dimensional array 12. The multi-dimensional array 12 may allow arbitrary setting of a two-dimensional transmit aperture. The transmit channels are connected to the elements such that a focusing profile is provided in parallel with the steering vector component on the face of the transducer array 12. An elevation axis of the transmit aperture is perpendicular to the azimuth axis. Azimuth rows of elements are spaced at different distances along and perpendicular to the elevation axis. The focusing profiles, such as delay, phase or apodization profiles are rotated to correspond with the intersection of the scan line direction with the face of the transducer array 12. The transmit aperture may include all of the same or different groups of elements for any given steering vector. Different or the same channel and element interconnections may be provided for different steering angles.

The transmit beamformer 12 is operable to apply an alternating pattern substantially perpendicular to the steering vector. The alternating pattern is a variation of one of waveform, delay, phase, apodization and combinations thereof. For example, a periodic variation in focusing profiles is provided. The periodic variation is in addition to any variation for focusing along the scan line. Any of various variations may be used, such as delaying the waveforms of every other element by quarter a period. As another example variation, half of the elements are transmitted without offsets to the focusing profile, a quarter of the elements are transmitted with a delay offset of an advance by one quarter of the center frequency and another quarter of the elements are delayed by one quarter of the center frequency. In yet another example, four different delays are used across the elevation axis of the transmit aperture. As yet another example, every other transmit waveform is inverted and a delay of one half of a period is applied for the inverted waveforms at the center frequency. As yet another example, a quarter of the elements transmit the desired waveforms with regular delays and apodization, one quarter of the elements are delayed by one-quarter the period, one quarter of the elements have an inverted waveform delayed by one-half the period of the center frequency, and the other quarter of elements have an inverted waveform advanced by one-quarter period of the center frequency. The spacing of elements responsive to different offsets is in any of various patterns, such as a repeating regular, irregular or other pattern. Any spacing of the elements responsive to various delays or patterns may be provided, such as providing for offsets in every other element, offsets for alternating pairs of elements, or offsets in other groupings of elements. Non-periodic variation is provided in alternative embodiments, such as varying the offsets in an irregular or regular but not repeating pattern.

The alternating pattern is applied perpendicular to the steering vector to avoid or minimize grating lobes. In parallel with the steering vector, the transmit beamformer 12 is operable to apply focusing profiles free of additional variations in delay, phase and apodization. In alternative embodiments, only one or two of waveform, delay, phase, and apodization are provided with focusing profiles free of variation in addition to any variation for focusing. In yet other alternative embodiments, one, two or all three of delay, phase and apodization variation in addition to focusing profiles is provided in parallel with the steering vector.

In the embodiment described above, the focusing profiles are provided as a function of variation across elements for a single scan line or a single transmission. The steering vector is identified by the scan line direction. Two or more transmit beams may be generated along one or two different scan lines during a given transmit event. The focusing profiles for the transmit aperture account for transmissions of multiple beams. For example, a delay at a given element is a function of a combination of waveforms for two different transmit beams. The azimuth and elevation axes for orienting the focusing profiles are either applied independently for each scan by summing any offsets for a channel or set based on an average Vector component direction.

In alternative embodiments, the transmit beamformer 12 is operable to apply the alternating pattern by variation across scan lines. For example, a plurality of scan lines are sequentially transmitted with the same or substantially same steering vector direction, such as scan lines transmitted along a same scan plane. The intersection of the scan plane with the face of the transducer array 12 indicates an azimuth axis or steering vector direction. Since the intersection of a steering vector component for any scan line within the scan plane may completely or at least partly relate to the intersection of the scan plane with the array 12, the intersection represents the azimuth axis. Where the scan plane is orthogonal to the array, steering vector components are completely represented by the intersection. Where the scan plane is at an angle to the array, a component of the steering vector for a given scan line may deviate from the intersection. Substantially same steering vector direction is used herein to account for such deviation. The phase/delay or apodization associated with each of the transmit beams is varied as a function of transmit beam or groups of transmit beams. This alternating pattern may be used in later combination of receive signals to cancel frequency bands and isolate information of interest.

The receive beamformer 16 is a digital or analog receive beamformer. The receive beamformer 16 is configured into a plurality of channels. Each of the channels applies a relative delay or phase and apodization. The delays, phases or apodization correspond to focusing profiles. In one embodiment, focusing profiles free of variation in addition to focusing are used, but other focusing profiles with periodic or other variations and offsets may be provided. The receive beamformer 16 receives information responsive to echoes from the transmit beams. Where the alternating pattern is provided across elements for a transmit beam, the received echo information includes isolated information at desired frequency bands and reduced information content at undesired frequency bands. Where the alternating pattern is provided as a function of scan line, the receive beamformer 16 is operable to combine information from adjacent or different scan lines to isolate information at desired frequency bands and cancel or reduce information content at undesired frequency bands. For example, the receive beamformer or associated components disclosed in U.S. Pat. No. 6,436,046, the disclosure of which is incorporated herein by reference, is provided.

Figure 2:
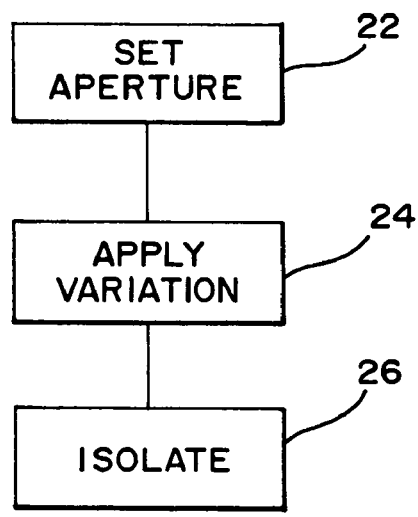
FIG. 2 is a flowchart diagram of one embodiment of a method for varying a pattern as a function of steering angle for medical imaging with a multi-dimensional array.

FIG. 2 is a flow chart representing one embodiment of a method for varying a pattern as a function of steering angle for medical imaging with a multi-dimensional array. In act 22, an aperture is set. Variation is then applied in act 24, resulting in the ability to isolate desired information in act 26. Additional, different or fewer acts may be provided. For example, the aperture does not change as a function of steering angle, but the variation is applied as a function of steering angle.

In act 22, an azimuth axis of the transmit aperture is set on the multi-dimensional array 12. The azimuth axis is set as substantially parallel with a steering vector on the face of the array. The steering vector is provided by the intersection of a two-dimensional component of the steering vector 28 shown in FIGS. 3 and 4 with the plane or other surface defined by the face 32 of the transducer 12. In one embodiment, the azimuth axis is set by identifying the steering vector component on the face 32 of the transducer. The steering vector component is then used as an azimuth axis for applying focusing profiles with or without additional variation. For example, the azimuth axis is identified for applying focusing profiles, such as delay, phase and/or apodization profiles substantially free of offsets along an axis parallel with the intersection of the steering vector component with the face 32 of the transducer array 12. The focusing profiles free of variation in addition to focusing profiles are provided for each of waveform, delay, phase and apodization. In one embodiment, the frequency varies as a function of steering angle along the azimuth axis, such as disclosed in U.S. Pat. No. 5,549,111, the disclosure of which is incorporated herein by reference. Lower transmit frequencies are used for larger steering angles. The delays may vary as a function of the different center transmit frequencies for focusing. Alternatively, one or more of delay, phase and apodization include offsets in addition to focusing profiles for steering.

FIGS. 3 and 4 show the steering vector component 30 of the scan line 28 along the face 32 of the transducer 12. As represented by the lines 34, an azimuth axis is set along or substantially parallel with the steering vector component 30. Substantially parallel is used to account for variance in element spacing where elements are spaced along the X and Y dimensions. By selecting a continuous or sparse grouping of elements along the steering vector direction, some elements may be offset from the line or axis. As shown in FIG. 3, the azimuth axis or rows of elements designated by 34 are at an angle to the rectangular grid along the X and Y dimensions. The elements are spaced in a plurality of rows along the X and Y dimensions. FIG. 4 shows an alternative where the scan line 28 is purposely steered to result in a vector component that is substantially parallel or parallel with the rectangular grid spacing of the elements. For example, the steering vector component 30 lies along the X axis or is parallel to the X axis of the grid spacing. As shown in FIG. 4, additional scan lines at different angles than the scan line 28 are provided in a same scan plane such that the steering vector direction is along the X axis. For the embodiment shown in FIG. 3, any arbitrary steering angle of scan line 28 may be used. Combinations of embodiments used in both FIGS. 3 and 4 configurations may be provided. As shown in FIG. 3, the periodic apodization, delay or phase patterns rotate with the transmit lines to redistribute grating lobe energy. As shown in FIG. 4, periodic apodization, delay or phase patterns are arranged in the Y direction to redistribute grating lobe energy.

An alternating pattern is applied substantially perpendicular to the steering vector, such as along an elevation axis, in act 24 of FIG. 2. The alternating pattern corresponds to a variation in the waveform, delay, phase, apodization or combinations thereof. For example, a periodic pattern of offsets is applied along one of and in addition to the focusing profiles. The offsets are applied along a profile for an axis substantially perpendicular to an intersection of the scan line vector 28 with the multi-dimensional transducer 12. Substantially perpendicular accounts for the possible non-linear nature of the axis through elements in a rectangular grid. In one embodiment, the variation applied is periodic, such as every other element, every second element, every third element, every group of elements or any other periodic pattern. In alternative embodiments, the variation is non-periodic, random or pursuant to a regular but non-periodic function within the span of the aperture. The offsets providing variation are offset from or in addition to focusing profiles. For example, delays, phases or apodization between elements is provided for steering along a scan line. The offsets are provided in addition to variations for steering. For example, any of the variations or offsets disclosed in U.S. Pat. Nos. 6,221,018; 6,193,659; and 6,436,046 are used. Other now known or latter developed variations within a transmit aperture may be provided. The patterns add a delay, phase or apodization offset pattern to transmit elements to assist in canceling or reducing undesired frequency components of the transmit beam and isolating desired information. By using a multi-dimensional array, the cyclic phase aperture or other pattern variation is set to be perpendicular to the steering angle direction to avoid or redistribute grating lobe energy.

In one embodiment, the variation in addition to focusing is applied as waveform variation. For example, unipolar transmit waveforms with different on and off sequences (e.g., pulse width modulation) and polarities are used. For different polarities, positive unipolar waveforms are applied to some element and negative unipolar waveforms are applied to other elements. The apodization has a positive and negative variation. The positive going pulses may be a different width or other characteristic than the negative going pulses, providing a different waveform. Alternatively or additionally, the waveforms may have the same polarity but other different characteristics.

In one embodiment, the variation in addition to focusing is applied as a delay. For example, unipolar or bipolar transmit waveforms are used. The focusing is provided by applying relative delays between waveforms from different elements or channels. In addition to the relative delays for focusing, offsets or other delays are provided in a cyclical pattern. Unipolar or bipolar waveforms from different channels are delayed further relative to each other or less relative to each other, such as a quarter period, half period, advanced quarter period or other delay as a function of the center transmit frequency. Some waveforms may have no additional offset while other waveforms have additional offset. Alternatively, all of the waveforms are offset by differing amounts. The offset is from the delay focusing profile for focusing or steering the transmit beams. In another embodiment, sinusoidal or waveforms more closely approximate to a sinusoidal waveform than unipolar or bipolar waveforms implement the delay approximately by phase shift. For example, a one-to-two cycle transmit waveform is shifted by an additional 90 or 180 degrees relative to another waveform from another channel or element. The phase shifts provide an approximation of an additional delay. In another embodiment, the apodization profile used for focusing is varied. For example, every third element transmits a pulse in conformance with an apodization profile for focusing. The other two elements of every third element have a one-half weighting of the apodization and a 180 degree phase shift or half-period delay. As summed in the acoustic domain at the focal point, information at the fundamental frequencies is reduced or cancelled and information at the second harmonic frequency is isolated from the fundamental information. The relative apodization weightings are the same for the delayed waveforms as the non-delayed waveforms. In alternative embodiments, different relative weightings are provided for isolating information at different frequency bands or with different bandwidths.

The variation in each aperture is the same or different for different scan lines. For example, variation of delays or waveforms is provided in a pattern across an aperture for one scan line. For a scan line with a greater steering angle, a different variation pattern of the same or different parameter (e.g. delay or waveform) is applied. Different variation offsets (e.g., delay values) or pattern of the same offsets may be used to implement the different variation. More high frequency suppression for larger steering angles may be provided by varying the pattern as a function of steering angle. The frequency content is adjusted as a function of scan line.

The variation or alternating pattern is applied across elements for a given scan line. The focusing profile is adjusted with offsets as a function of the steering vector. A repeating or variation in offsets across an aperture, such as perpendicular to the steering vector associated with the scan line, is applied. In alternative embodiments, the alternating pattern is applied across scan lines. Variation in phase or apodization associated with scan lines is provided. Each of the scan lines is associated with a substantially same steering vector direction, such as being in a same scan plane. For example, a periodic pattern of differences in phase as a function of scan line in a same scan plane is provided. Periodic variation in delays, apodization or combinations of two or more of phase, delay and apodization may be provided across a plurality of scan lines. The scan lines are associated with a substantially same scan line vector direction so that the offsets are applied substantially perpendicular to the scan line vector direction. Different or no offsets are provided in a substantially parallel direction with the scan line vector direction.

In act 26, echo information associated with a first frequency band is isolated based on the offsets or alternating pattern. Echo information at another frequency band is reduced based on the offsets. For example, a unipolar waveform is generated with a center frequency of 1.25 Megahertz. Unipolar waveforms are applied to each of a plurality of channels. Relative delays and apodizations are applied to steer acoustic energy along a scan line that is at 40 degrees from the azimuth, 22.6 degrees from the elevation dimension and 45 degrees from orthogonal to the face of the transducer (i.e., the range or Z dimension). In this example, the azimuth and elevation angles are from the rectangular grid of the transducer elements. The azimuth axis is then set based on the azimuth and elevation angles. The azimuth axis is set to be parallel with a vector provided by the 40 degrees and 22.6 degree angles. Offsets are applied perpendicular to the azimuth axis or the steering vector component on the face of the transducer. For example, quarter-period delays are provided on every other element while no additional offset is provided on the remaining elements. In the acoustic domain, the acoustic energy sums to provide cancellation at the second harmonic 2.5 MHz frequency. For example, −10 dB down from the DC is provided at 2 and 3 MHz. A lesser reduction is provided at the fundamental transmit frequency of 1.25 MHz, such as a reduction of about −3 dB. The information at the fundamental transmit frequency is isolated from the reduced or cancelled information at the second harmonic frequency band around 2.5 MHz. Different delay, phase or apodization offsets may be provided for isolating information in the same or different frequencies while reducing information at the same or different frequency bands. For example, every two to four elements correspond to a focusing delay and the remaining groups of two or four elements correspond to a half of a period delay. In the acoustic domain, the waveforms sum to cancel fundamental information while isolating information at the second harmonic frequency bands. Different apodization weightings may be provided to alter the bandwidth of any isolation or reduction. Combinations of two or more of phase, delay and apodization offsets may be provided for isolating information at different frequency bands, such as isolating information at odd harmonics from information at even harmonics or vice versa.

The application of steering vector angle dependent offsets and focusing profiles is provided for one scan line out of many. Alternatively, the same or different offsets are provided for a plurality of scan lines, such as all non-normal scan lines, scan lines associated with a steering angle greater than 5, 10, 15, 20 or 25 percent away from the normal or Z dimension, or any other subsets of scan lines. The application of variation patterns is provided for the scan lines of one scan plane, a plurality of scan planes or all scan planes. For example, each scan plane is spaced in parallel along the azimuth axis and is represented by signals received in response to transmit beams with offsets applied along the dimension perpendicular to the steering vector intersection with the transducer 12 and not applied in parallel with the steering vector. As an alternative embodiment, each of the scan planes is associated with a rotation of a scan plane from a single intersection with the face 32 of the transducer array 12 or intersections offset along the elevation dimension but still associated with rotation of the scan planes. The angle dependence of the focusing profile offsets is applied individually for each scan line or is applied as a function of the scan plane.

FIG. 5 shows one embodiment of an azimuth axis 36 corresponding to intersection of the steering vector 30 with the face 32 of the transducer 12. The steering vector is at an angle to the X and Y dimensions, such as at an angle of 40 degrees from the X dimension and 22.6 degrees from the Y dimension. The stripes in FIG. 5 correspond to the variation pattern. Along the azimuthal axis 36, the variation is only for focusing in this embodiment. Along the perpendicular azimuthal axis 36, the stripping indicates additional offsets to the focusing profiles, such as delay or apodization offsets or variation along the elevation dimension.

FIG. 6 shows one example of redistributing grating lobes. In the configuration discussed above for FIG. 5, the leftmost image shows the grating lobes created by the transmission pattern using a 30 element by 30 element transducer array. The transmit frequency is 1.25 MHz with a receive frequency of 2.5 MHz. Every other element is associated a quarter-period delay for cancellation of information at the fundamental frequencies. The middle image represents the receive operation function at 2.5 MHz. The signal shown in the lower right corner is associated with the desired signal and the remaining peaks at the other corners are associated with grating lobes. The two-way response is shown in the rightmost image. Based on the two-way response, the information of interest is without significant grating lobes. By adjusting the application of cyclic phase aperture patterns or other variation, the grating lobe energy is redistributed or different in the transmit and receive direction to provide a reduced overall grating lobe effects.

While the invention has been described above by reference to various embodiments, it should be understood that many changes and modifications can be made without departing from the scope of the invention. For example, different transmit pulses may be provided for each element within an aperture, such as unipolar pulses for some elements and bipolar pulses for other elements. As another example, one or more transmit beams are fired simultaneously. For a receive processing, one or more receive beams are received in response to each transmit beam. For example, 2, 4, 8, 16 or any other number of receive beams may be used for each transmit beams to reduce frame rate. As yet another example, delays of half a period, one-third a period, one-fourth a period, other fractions and combinations thereof may be used.

It is therefore intended that the foregoing detailed description be regarded as illustrative rather than limiting, and that it be understood that it is the following claims, including all equivalents, that are intended to define the spirit and the scope of this invention.

I claim:

1. A method for varying a pattern as a function of steering angle for medical imaging with a multi-dimensional array, the method comprising:

(a) setting an azimuth axis of a transmit aperture of the multidimensional array of N×M transducer elements, where N and M are both greater than 1, as substantially parallel with a first steering vector on a face of the array of transducer elements;

(b) applying, to the transmit aperture, an alternating pattern substantially perpendicular to the steering vector, the alternating pattern being a repeating pattern of variation of one of: waveform, delay, phase, apodization and combinations thereof along an elevation axis.

2. The method of claim 1 wherein (b) comprises applying the alternating pattern by variation across scan lines, each of the scan lines associated with a substantially same steering vector direction and in a same scan plane.

3. The method of claim 1 wherein (b) comprises applying the alternating pattern by variation across elements for a scan line, the scan line associated with the steering vector.

4. The method of claim 1 wherein (b) comprises variation in addition to focusing profiles.

5. The method of claim 4 wherein (b) comprises applying variation that is periodic.

6. The method of claim 1 further comprising:
(c) applying focusing profiles free of variation in any one of: delay, phase and apodization in addition to focusing profiles along the azimuth axis.

7. The method of claim 1 wherein (b) comprises applying the variation as a delay variation to one of unipolar and bipolar transmit waveforms.

8. The method of claim 1 wherein (b) comprises applying the variation as a phase variation to sinusoidal transmit waveforms.

9. The method of claim 1 wherein (b) comprises applying the variation as an apodization including positive and negative apodization variation.

10. The method of claim 1 further comprising:
(c) performing (a) and (b) for each of a plurality of scan planes spaced along the elevation axis.

11. A system for varying a pattern as a function of steering angle for medical imaging with a multi-dimensional array, the system comprising:
the multi-dimensional array having N×M transducer elements wherein N and M are both greater than 1;
a transmit beamformer comprising a controller configured to set an azimuth axis of a transmit aperture on the multi-dimensional array as substantially parallel with a first steering vector on a face of the multi-dimensional array, and the controller further configured to apply, to the transmit aperture, an alternating pattern substantially perpendicular to the steering vector, the alternating pattern being a periodic variation of one of: waveform, delay, phase, apodization and combinations thereof.

12. The system of claim 11 wherein the controller is configured to apply the alternating pattern by variation across scan lines, each of the scan lines associated with a substantially same steering vector direction and in a same scan plane.

13. The system of claim 11 wherein the controller is configured to apply the alternating pattern by variation across elements for a scan line, the scan line associated with the steering vector.

14. The system of claim 11 wherein the controller is configured to apply the periodic variation in addition to focusing profiles.

15. The system of claim 11 wherein the controller is configured to apply focusing profiles free of variation in any one of: waveform, delay, phase and apodization in addition to focusing profiles along the azimuth axis.

16. A method for varying a pattern as a function of steering angle for medical imaging with a multi-dimensional array, the method comprising:
(a) applying, in an aperture, a periodic pattern of offsets along a first profile for focusing along a first axis substantially perpendicular to an intersection of a scan line vector with a multi-dimensional transducer; and
(b) applying, in the aperture, a second profile for focusing substantially free of offsets along a second axis substantially parallel with the intersection;
wherein (b) comprises setting an azimuth axis of a transmit aperture of the multidimensional transducer as substantially parallel with the intersection and wherein (a) comprises applying the periodic pattern being a variation of one of: delay, phase, apodization and combinations thereof along an elevation axis substantially perpendicular with the intersection.

17. The method of claim 16 wherein (a) comprises applying the periodic pattern along the first profile, the first profile representing variation of one of: waveform, phase, delay, apodization and combinations thereof across a plurality of scan lines, each of the plurality of scan lines associated with a substantially same scan line vector direction.

18. The method of claim 16 wherein (a) comprises applying the periodic pattern by variation across elements for a scan line, the first profile being for the scan line.

19. The method of claim 16 further comprising:
(c) isolating echo information at a first frequency band in response to (a); and
(d) reducing echo information at a second frequency band in response to (a), the second frequency band different than the first frequency band.

20. The method of claim 1 wherein (b) comprises applying the variation as waveform variation.

* * * * *